US008842894B2

(12) United States Patent
Ihara

(10) Patent No.: US 8,842,894 B2
(45) Date of Patent: *Sep. 23, 2014

(54) TREE STRUCTURE EXTRACTION APPARATUS, METHOD AND PROGRAM

(75) Inventor: Satoshi Ihara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 13/454,765

(22) Filed: Apr. 24, 2012

(65) Prior Publication Data

US 2012/0275682 A1  Nov. 1, 2012

(30) Foreign Application Priority Data

Apr. 27, 2011 (JP) ................................ 2011-098925

(51) Int. Cl.
G06K 9/00 (2006.01)
G06T 7/00 (2006.01)

(52) U.S. Cl.
CPC ..... *G06T 7/0012* (2013.01); *G06T 2207/10072* (2013.01); *G06T 2207/20072* (2013.01); *G06T 2207/30101* (2013.01); *G06T 7/0087* (2013.01)
USPC ........... 382/128; 382/130; 382/131; 382/132; 600/429; 600/459

(58) Field of Classification Search
None
See application file for complete search history.

(56) References Cited

U.S. PATENT DOCUMENTS

| 6,430,430 | B1 * | 8/2002 | Gosche | 600/410 |
|---|---|---|---|---|
| 6,449,502 | B1 * | 9/2002 | Ohkubo | 600/407 |
| 7,346,209 | B2 * | 3/2008 | Gokturk et al. | 382/159 |
| 7,418,121 | B2 * | 8/2008 | Kasai | 382/128 |
| 7,542,959 | B2 * | 6/2009 | Barnhill et al. | 706/48 |
| 7,646,903 | B2 * | 1/2010 | Kaftan et al. | 382/128 |
| 8,311,307 | B2 * | 11/2012 | Kitamura | 382/131 |
| 8,345,940 | B2 * | 1/2013 | Mattiuzzi et al. | 382/128 |
| 8,417,009 | B2 * | 4/2013 | Mizuno | 382/131 |
| 8,422,752 | B2 * | 4/2013 | Sakuragi | 382/128 |

(Continued)

FOREIGN PATENT DOCUMENTS

| JP | 2007-44488 A | 2/2007 |
|---|---|---|
| JP | 2010-220742 A | 10/2010 |

OTHER PUBLICATIONS

Extended European Search Report dated Jul. 11, 2012.

(Continued)

*Primary Examiner* — Jayesh A Patel
*Assistant Examiner* — Iman K Kholdebarin
(74) *Attorney, Agent, or Firm* — McGinn IP Law Group, PLLC

(57) ABSTRACT

Tree structures corresponding to a first linear structure and a second linear structure are constructed from medical image data including the first linear structure and the second linear structure, each repeatedly branching from an origin and extending in directions away from the origin in such a manner to become wider. Each of a first root node corresponding to a root node in the first tree structure and a second root node corresponding to a root node in the second tree structure is connected to each node, based on the characteristic that each of the first and second linear structures repeatedly branches from the origin and extends in directions away from the origin in such a manner to become wider, by using, with respect to each node, a cost function that weights a cost representing a probability of connection of each of a plurality of edges connectable to each node.

20 Claims, 9 Drawing Sheets

(56) References Cited

U.S. PATENT DOCUMENTS

| | | | |
|---|---|---|---|
| 8,515,133 B2* | 8/2013 | Kitamura | 382/103 |
| 8,526,690 B2* | 9/2013 | Kitamura | 382/128 |
| 8,611,623 B2* | 12/2013 | Kurihara et al. | 382/128 |
| 8,618,521 B2* | 12/2013 | Loo et al. | 250/492.3 |
| 8,630,467 B2* | 1/2014 | Masumoto | 382/128 |
| 8,634,628 B2* | 1/2014 | Inoue | 382/131 |
| 2003/0171668 A1* | 9/2003 | Tsujino et al. | 600/407 |
| 2005/0207630 A1* | 9/2005 | Chan et al. | 382/131 |
| 2007/0001879 A1 | 1/2007 | Kaftan et al. | |
| 2008/0044080 A1* | 2/2008 | Li | 382/155 |
| 2008/0312527 A1* | 12/2008 | Masumoto et al. | 600/425 |
| 2009/0076394 A1* | 3/2009 | Wong et al. | 600/459 |
| 2009/0156895 A1* | 6/2009 | Higgins et al. | 600/104 |
| 2009/0252394 A1* | 10/2009 | Liang et al. | 382/131 |
| 2009/0252395 A1* | 10/2009 | Chan et al. | 382/131 |
| 2009/0278846 A1* | 11/2009 | Gulsun et al. | 345/423 |
| 2010/0063410 A1* | 3/2010 | Avila | 600/532 |
| 2010/0082692 A1* | 4/2010 | Akinyemi et al. | 707/797 |
| 2010/0114813 A1* | 5/2010 | Zalay et al. | 706/58 |
| 2010/0136129 A1* | 6/2010 | Agueros Bazo et al. | 424/499 |
| 2010/0211588 A1 | 8/2010 | Jiang et al. | |
| 2010/0246912 A1 | 9/2010 | Periaswamy et al. | |
| 2010/0296709 A1* | 11/2010 | Ostrovsky-Berman et al. | 382/128 |
| 2010/0310146 A1* | 12/2010 | Higgins et al. | 382/131 |
| 2011/0052026 A1* | 3/2011 | Liao et al. | 382/131 |
| 2011/0075900 A1* | 3/2011 | Masumoto | 382/128 |
| 2011/0093243 A1* | 4/2011 | Tawhai et al. | 703/2 |
| 2011/0135172 A1* | 6/2011 | Kitamura | 382/128 |
| 2011/0268338 A1* | 11/2011 | Collins et al. | 382/131 |
| 2012/0083696 A1* | 4/2012 | Kitamura | 600/443 |
| 2012/0269410 A1* | 10/2012 | Ihara | 382/128 |
| 2012/0275682 A1* | 11/2012 | Ihara | 382/134 |
| 2013/0108131 A1* | 5/2013 | Abramoff et al. | 382/131 |
| 2013/0108133 A1* | 5/2013 | Inoue | 382/131 |
| 2013/0301889 A1* | 11/2013 | Abramoff et al. | 382/128 |

OTHER PUBLICATIONS

Bauer, et al., "Segmentation of interwoven 3d Tubular Tree Structures Utilizing Shape Priors and Graph Cuts", Medical Image Analysis, Oxford University Press, Oxford, GB, vol. 14, No. 2, Apr. 1, 2010, pp. 172-184, XP026889211, ISSN: 1361-8415, 001: 10.1016/J.MEDIA.2009.11.003.

Homann, et al., "Vasculature Segmentation of CT Liver Images Using Graph Cuts and Graph-Based Analysis", Biomedical Imaging: From Nano to Macro, 2008. ISBI 2008. 5th IEEE International Symposium on, IEEE, Piscataway, NJ, USA, May 14, 2008, pp. 53-56, XP031270974, ISBN: 978-1-4244-2002-5.

Soler, et al., "Fully Automatic Anatomical, Pathological and Functional Segmentation From CT Scans for Hepatic Surgery", Computer Aided Surgery, vol. 6, Jan. 1, 2001, pp. 131-142, XP55030271, Retrieved from Internet: URL:http://onlinelibrary.wiley.com/store/10.1002/igs.1016/asset/1016_ftp.pdf?v=1 &t=h3mnhaxr &s=f6ge819013ec44998f5fcffc04f43a4619445391.

Dirk Selle, et al.,"Analysis of Vasculature for Liver Surgical Planning", IEEE Transactions on Medical Imaging, IEEE Service Center, Piscataway, NJ, US, vol. 21, No. 11), Nov. 1, 2002, XP011 076391, ISSN: 0278-0062.

Japanese Office Action dated Apr. 16, 2013 and English translation thereof.

Chia-Ling Tsai, Yi-Lun Yang, Shih-Jen Chen, Chih-Hao Chan, Wei-Yang Lin, Automatic characterization and segmentation of classic choroidal neovascularization using Adaboost for supervised learning, Nuclear Science Symposium Conference Record (NSS/MIC), 2010 IEEE, Oct. 30, 2010, 3610-3612.

Pechin Lo, van Ginneken, B., de Bruijne, M., Vessel tree extraction using locally optimal paths, Biomedical Imaging: From Nano to Macro, 2010 IEEE, Apr. 14, 2010, 680-683.

Notification of Grounds for Rejection dated Jul. 9, 2013, with English translation.

Notification of Grounds for Rejection dated Apr. 16, 2013, with English translation.

Chia-Ling Tsai, Yi-Lun Yang, Shih-Jen Chen, Chih-Hao Chan, Wei-Yang Lin, Automatic characterization and segmentation of classic choroidal neovascularization using Adaboost for supervised learning, Nuclear Science Symposium Conference Record (NSS/MIC), 2010 IEEE, Oct. 30, 2010, 3610-3612 (Previously filed on Jul. 15, 2013).

Pechin Lo, van Ginneken, B., de Bruijne, M., Vessel tree extraction using locally optimal paths, Biomedical Imaging: From Nano to Macro, 2010 IEEE, Apr. 14, 2010, 680-683 (Previously filed on Jul. 15, 2013).

United States Notice of Allowance dated Feb. 12, 2014, in U.S. Appl. No. 13/450,325.

Chia-Ling Tsai, Yi-Lun Yang, Shih-Jen Chen, Chih-Hao Chan, Wei-Yang Lin, Automatic characterization and segmentation of classic choroidal neovascularization using Adaboost for supervised learning, Nuclear Science Symposium Conference Record (NSS/MIC), 2010 IEEE, Oct. 30, 2010, 3610-3612 (previously submitted on Jul. 15, 2013).

* cited by examiner

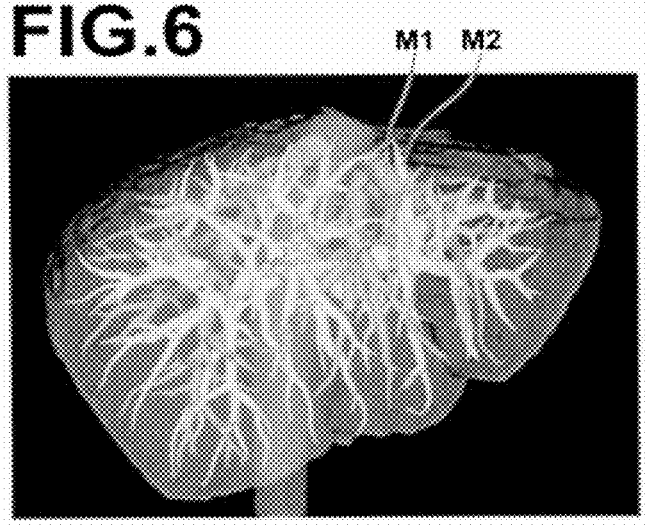
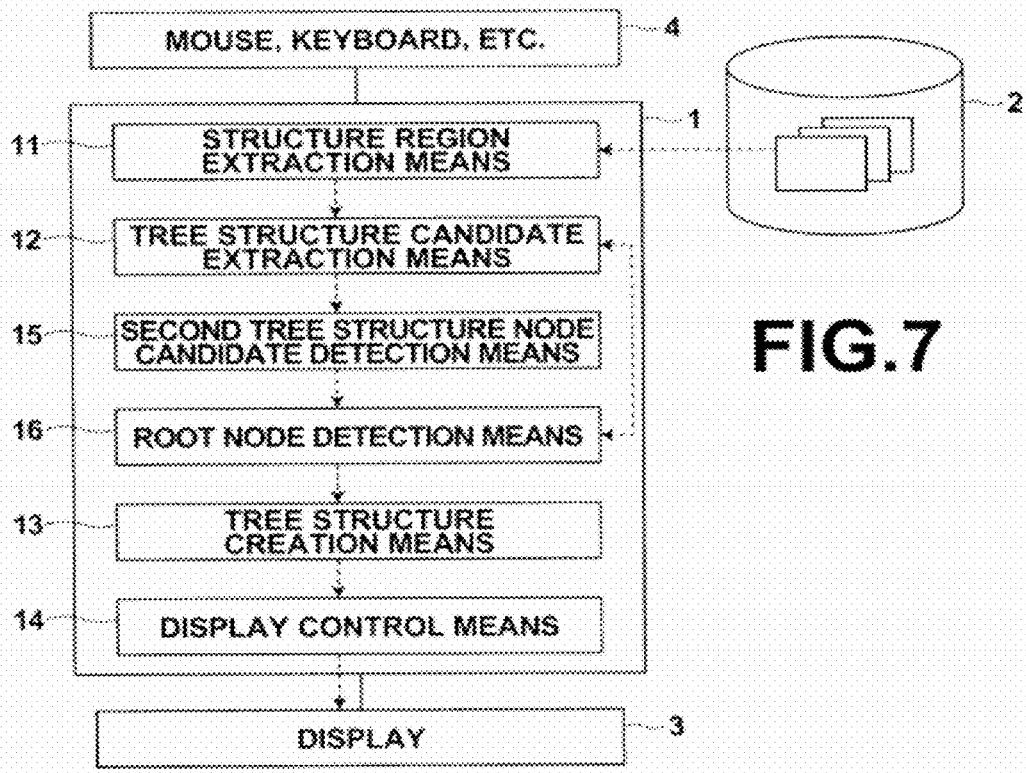

TREE STRUCTURE EXTRACTION APPARATUS, METHOD AND PROGRAM

BACKGROUND OF THE INVENTION

1. Field of the Invention

The present invention relates to a tree structure extraction apparatus, method and program for constructing tree structures of specific structures detected in image data. Particularly, the present invention relates to a tree structure extraction apparatus, method and program for constructing tree structures of plural specific structures located close to each other, for example, such as a portal vein and hepatic veins in a liver, respectively. The portal vein and the hepatic veins in the liver run close to each other as if branches of blood vessels of the portal vein and those of the hepatic veins are entangled or intermingled with each other.

2. Description of the Related Art

When a surgery is performed on an organ, such as a liver and a lung, to remove a diseased part therefrom, for example, if the organ is a liver, blood vessels, a hepatic parenchyma, and a tumor region need to be extracted from an X-ray CT image of the liver. Further, a blood vessel dominating the extracted tumor region needs to be identified based on the positions of core lines, diameters and the like of the extracted blood vessels. In this way, the blood vessel that supplies nutrition to the tumor should be identified, and a region dominated by the blood vessel should be appropriately determined, as a region to be removed. Such processes are necessary to appropriately remove a part of a portal vein supplying nutrition to the tumor and a region that is dominated by the part of the portal vein, and into which a substance to be noted, such as cancer cells, may have spread, in such a manner that the function of the liver is maintained even after removal. Therefore, it is important to precisely simulate a region to be removed before the surgery. Further, it is necessary to accurately extract the center lines of blood vessels running in a lung or a liver for the simulation operation.

Here, a method using a Hessian matrix has been proposed, as an image recognition technique for extracting a linear structure, such as bronchi, from a three-dimensional medical image obtained by CT or the like. Specifically, first, multiple resolution transformation is performed on the three-dimensional medical image. Then, an eigenvalue analysis of Hessian matrix is performed on an image of each resolution, and linear structure elements are extracted. The linear structure element has a characteristic that only one of three eigenvalues obtained by eigenvalue analyses is close to 0. Then, analysis results about images of respective resolutions are unified to extract linear structure elements (blood vessels) in various sizes from the three-dimensional medical image. Further, the extracted linear structure elements are connected to each other by using minimum spanning tree algorithm or the like. Consequently, data of a tree structure representing a tubular structure in the three-dimensional medical image are obtained. When the linear structure elements are connected to each other by using minimum spanning tree algorithm, a cost function based on a positional relationship between the linear structure elements and the principal axis direction of each of the linear structure elements represented by an eigenvector corresponding to an eigenvalue close to 0 is used (U.S. Patent Application Publication No. 20110135172 (Patent Document 1)).

However, when the number of times of branching is large and branches of blood vessels run close to each other as if they are entangled with each other, as in a portal vein and hepatic veins in a liver, if blood vessels such as the portal vein are extracted by using a technique similar to Patent Document 1, a branch of a hepatic vein, which is not the portal vein, is erroneously extracted as a branch of the portal vein in some cases.

SUMMARY OF THE INVENTION

In view of the foregoing circumstances, it is an object of the present invention to provide a tree structure extraction apparatus, method and program that can extract plural blood vessels repeatedly branching from an origin and extending in directions away from the origin in such a manner to become wider more efficiently and more accurately than conventional techniques. For that purpose, the present invention utilizes a characteristic that branches of a portal vein and branches of blood vessels in a lung, unlike other blood vessels, repeatedly branch from origins and extend in directions away from the origins in such a manner to become wider.

A tree structure extraction apparatus of the present invention is a tree structure extraction apparatus that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the apparatus comprising:

a tree structure creation means that connects, based on the characteristic that each of the first linear structure and the second linear structure repeatedly branches from the origin and extends in directions away from the origin in such a manner to become wider, each of a first root node corresponding to the root node in the first tree structure and a second root node corresponding to the root node in the second tree structure to the plurality of nodes by using, with respect to each of the plurality of nodes, a cost function that weights a cost representing a probability of connection of each of a plurality of edges connectable to each of the plurality of nodes.

A tree structure extraction method of the present invention is a tree structure extraction method that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the method comprising the step of:

connecting, based on the characteristic that each of the first linear structure and the second linear structure repeatedly branches from the origin and extends in directions away from the origin in such a manner to become wider, each of a first root node corresponding to the root node in the first tree structure and a second root node corresponding to the root node in the second tree structure to the plurality of nodes by using, with respect to each of the plurality of nodes, a cost function that weights a cost representing a probability of connection of each of a plurality of edges connectable to each of the plurality of nodes.

A tree structure extraction program of the present invention is a tree structure extraction program that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the program causing a computer to function as:

a tree structure creation means that connects, based on the characteristic that each of the first linear structure and the second linear structure repeatedly branches from the origin and extends in directions away from the origin in such a manner to become wider, each of a first root node corresponding to the root node in the first tree structure and a second root node corresponding to the root node in the second tree structure to the plurality of nodes by using, with respect to each of the plurality of nodes, a cost function that weights a cost representing a probability of connection of each of a plurality of edges connectable to each of the plurality of nodes.

Here, the first and second linear structures may be any structure as long as the structure is an object from which a shape model, as a tree structure with a root composed of nodes and edges connecting the nodes, is creatable, and the structure repeatedly branches from an origin and extends in directions away from the origin in such a manner to become wider. For example, the first and second linear structures may be blood vessels in a lung or a liver. Further, the second linear structure may be a linear structure or plural linear structures. For example, the first and second linear structures may be pulmonary arteries and pulmonary veins in the lung, or a portal vein, hepatic arteries, and hepatic veins in the liver, or the like.

The medical image data may be obtained by imaging, for example, by a CT, MR, ultrasonic, PET-CT, SPECT, 4D-CT, OCT, or X-ray radiography (CR, DR) apparatus. For example, the medical image data may be three-dimensional image data, such as volume data.

In the present invention, any spanning tree algorithm may be adopted to "create a tree structure" as long as nodes are connectable to each other from each of the first root node corresponding to the root node in the first tree structure and the second root node corresponding to the root node in the second tree structure in such a manner that the strength of connection between the nodes becomes high by calculating, as a cost, an index value representing the strength of connection between the nodes for each of the nodes. For example, Prim's algorithm may be adopted as the spanning tree algorithm that can create plural tree structures by scanning nodes from plural roots, respectively.

Further, the expression "create a tree structure by connecting each of a first root node corresponding to the root node in the first tree structure and a second root node corresponding to the root node in the second tree structure to a plurality of nodes" means that connection between nodes is determined based on both of costs calculated for nodes connectable to each node constituting the first tree structure and costs calculated for nodes connectable to each node constituting the second tree structure. Specifically, in conventional methods, connection between nodes is determined by comparing costs between connectable nodes only with respect to the first tree structure (or the second tree structure), using the first root node (or the second root node) as a root. However, in the present invention, connection is determined in such a manner that nodes with a highest probability of connection are connected to each other based on costs calculated for nodes connectable to each node constituting the first tree structure and costs calculated for nodes connectable to each node constituting the second tree structure, using both of the first root node in the first linear structure and the second root node in the second linear structure, as roots.

In the present invention, it is desirable that the cost function weights the cost, with respect to each of the plurality of nodes, in such a manner that a probability of connection of a root-node-side edge, which is connected to each of the plurality of nodes from a first root node side or a second root node side thereof, is lower as an angle between a plurality of edges that are connectable to each of the plurality of nodes and other than the root-node-side edge is larger.

An origin may be identified by using an arbitrary method. Further, a root node corresponding to the origin may be identified based on the origin by using a known method. For example, the origin may be selected in a displayed image by using an input device, such as a mouse. Further, an origin detection means that detects the origin by performing machine learning on plural sets of training data, each representing a tree structure in which an origin is known, may be provided, and the origin may be detected by the origin detection means. Various kinds of known method in which a root node is extracted by performing machine learning on training data may be used. For example, the origin may be detected based on the feature value of the origin that is known in training data by an Adaboost algorithm.

In the tree structure extraction apparatus, the second root node may be identified by using an arbitrary method. For example, an origin of the second linear structure may be selected in a display screen by a user's manual operation at an input device, such as a mouse, and a node corresponding to the coordinate value of the selected coordinate may be identified as the second root node. Alternatively, the second root node may be automatically extracted by using various methods, and identified. It is desirable that the tree structure extraction apparatus further includes, for example, a second tree structure node candidate detection means and a root node detection means. The second tree structure node candidate detection means extracts, from the medical image data, the first linear structure as a provisional tree structure defined by a plurality of nodes including the first root node and a plurality of edges, and detects, with respect to each of the plurality of nodes, a node connected to an edge extending in a direction closer to the first root node from the node in a manner contrary to the characteristic that the first linear structure repeatedly branches from the origin and extends in directions away from the origin in such a manner to become wider, as a candidate of anode constituting the second tree structure, based on an angle between a segment connecting the first root node and each of the plurality of nodes and each edge connecting each of the plurality of nodes connected to the first root node and a node connectable to the node, in the extracted provisional tree structure. Further, the root node detection means detects the second root node based on the detected candidate of a node constituting the second tree structure.

It is desirable that the second tree structure node candidate detection means defines the angle between the segment connecting the first root node and each of the plurality of nodes and each edge connecting each of the plurality of nodes connected to the first root node and a node connectable to the node by an inner product of the segment connecting the first root node and each of the plurality of nodes and each edge connecting each of the plurality of nodes connected to the first root node and a node connectable to the node.

In detection of the second root node, when the origin of the first linear structure and the origin of the second linear structure are located close to each other, the root node detection means may detect the second root node, based on the angle between the segment connecting the first root node and each of the plurality of nodes and each edge connecting each of the plurality of nodes connected to the first root node and a node connectable to the node, by sequentially searching nodes located in a direction approaching the first root node corresponding to the first linear structure from the candidate of a node constituting the second tree structure.

It is desirable that the root node detection means defines the angle between the segment connecting the first root node and each of the plurality of nodes and each edge connecting each of the plurality of nodes connected to the first root node and a node connectable to the node by an inner product of the segment connecting the first root node and each of the plurality of nodes and each edge connecting each of the plurality of nodes connected to the first root node and a node connectable to the node.

In the tree structure extraction apparatus, method and program of the present invention, a tree structure is created by connecting, based on the characteristic that each of the first linear structure and the second linear structure repeatedly branches from the origin and extends in directions away from the origin in such a manner to become wider, each of a first root node corresponding to the root node in the first tree structure and a second root node corresponding to the root node in the second tree structure to the plurality of nodes by using, with respect to each of the plurality of nodes, a cost function that weights a cost representing a probability of connection of each of a plurality of edges connectable to each of the plurality of nodes. The tree structure is created by reevaluating a probability of connection between nodes in the tree structure by utilizing the geometric characteristic that each structure repeatedly branches from an origin and extends in directions away from the origin in such a manner to become wider. Therefore, it is possible to efficiently and accurately create the first tree structure and the second tree structure by suppressing erroneous connection between a node belonging to the first linear structure and a node belonging to the second linear structure even at a portion in which the first linear structure and the second linear structure are located close to each other.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 6 is a so-called image diagram illustrating a portal vein and hepatic veins in a liver displayed based on the extracted first tree structure and second tree structure;

FIG. 7 is a functional block diagram illustrating a tree structure extraction apparatus according to a second embodiment of the present invention;

DESCRIPTION OF THE PREFERRED EMBODIMENTS

Figure 1:
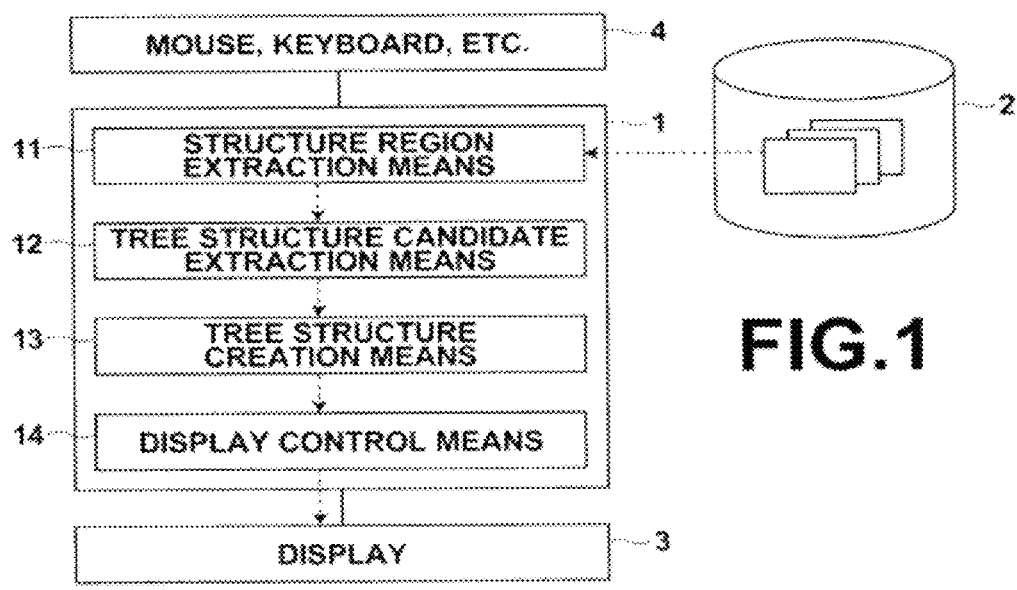
FIG. 1 is a functional block diagram illustrating a tree structure extraction apparatus according to a first embodiment of the present invention.

Hereinafter, embodiments of a tree structure extraction apparatus according to the present invention will be described in detail with reference to drawings. FIG. 1 is a schematic diagram illustrating the configuration of a tree structure extraction apparatus 1 according to a first embodiment of the present invention. The configuration of the tree structure extraction apparatus 1, as illustrated in FIG. 1, is realized by causing a computer to execute a tree structure extraction program that has been read in an auxiliary storage apparatus. At this time, the tree structure extraction program is stored in a recording medium, such as a CD-ROM, or distributed through a network, such as the Internet, and installed in the computer. The tree structure extraction apparatus 1, illustrated in FIG. 1, creates a tree structure representing a portal vein (first linear structure) and a tree structure representing hepatic veins (second linear structure) from image data representing linear structures, such as the portal vein and the hepatic veins in the liver, respectively. The tree structure extraction apparatus 1 includes a structure region detection means 11, a tree structure candidate extraction means 12, a tree structure creation means 13 and a display control means 14. Further, the computer in which a tree structure extraction program according to an embodiment of the present invention has been installed includes a main body that functions as the tree structure extraction apparatus 1, a display device 3 including a display, an input device 4, such as a mouse and a keyboard, and a storage means 2 including a memory, a hard disk, or the like.

Figure 2:
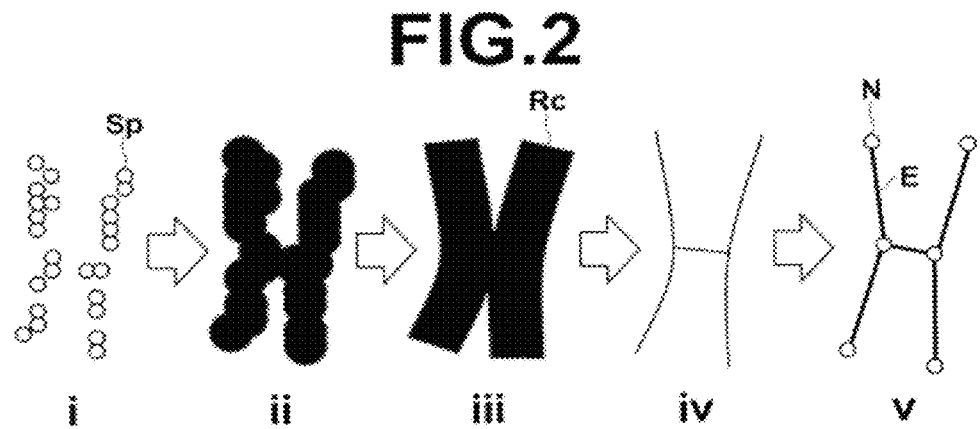
FIG. 2 is a diagram for explaining processing for extracting candidates of tree structures of a portal vein and hepatic veins in a liver in the first embodiment.

The structure region detection means 11 detects candidate region Rc by judging whether a region constitutes a part of a portal vein or hepatic veins in image data. Image data 7 include a two-dimensional image that has been obtained, for example, by imaging at a radiography apparatus or a radiation detection apparatus, and stored in the storage means 2, or three-dimensional volume data generated from plural two-dimensional images. FIG. 2 is a schematic diagram illustrating a manner of extracting a candidate of a tree structure. In FIG. 2, blood vessels that are a region representing a portal vein or hepatic veins are extracted, as candidate region Rc of blood vessels, and a graph based on the extracted candidate region Rc of the blood vessels is generated to extract the candidate of the tree structure.

Here, a case in which the linear structures are a portal vein (first structure) and hepatic veins (second structure) in a liver, and candidate regions Rc of the portal vein and the hepatic veins are detected in volume data will be described, as an example.

First, as illustrated in FIG. 2 (Step i), the structure region detection means 11 calculates the positions of plural candidate points Sp (p=1 to n: n is the number of extracted candidate points) constituting a core line of the portal vein or the hepatic veins based on the values of voxel data constituting volume data 7. Here, the values of voxel data that have been known to represent a portal vein or hepatic veins are obtained by statistics or the like before calculating the aforementioned positions, and voxels (pixels) that are likely to be the portal vein or hepatic veins are judged as candidate points Sp based on the obtained values of voxel data.

Further, as illustrated in FIG. 2 (Step ii), the structure region detection means 11 expands the candidate points Sp. Further, as illustrated in FIG. 2 (Step iii), the structure region detection means 11 judges, as a portal vein region or a hepatic vein region, image data having voxel values (pixel values) within a predetermined range including voxel values (pixel values) of the expanded candidate points Sp that represent the portal vein or the hepatic veins, and extracts the portal vein region or the hepatic vein region, as candidate region Rc.

The method for extracting the candidate region Rc is not limited to the method used in the present embodiment, and the structure region detection means 11 may adopt various kinds of known method that can extract candidate region Rc. For example, the structure region detection means 11 may calculate feature values representing the likelihood of a portal vein (or hepatic veins) with respect to voxel data in the vicinity of the candidate points, and identify, based on the calculated feature values, whether the voxel data represent a portal vein region (hepatic vein region). In such a case, the identifying operation based on the feature values may be performed based on an evaluation function that has been obtained in advance by machine learning. Alternatively, the structure region detection means 11 may detect the candidate region by using a technique disclosed in Patent Document 1, or other known techniques.

Next, the tree structure candidate extraction means 12 extracts a portal vein and hepatic veins, as a candidate of a first tree structure and a candidate of a second tree structure, each defined by plural nodes including a root node corresponding to an origin and plural edges. In the present embodiment, first, the tree structure candidate extraction means 12 obtains candidate region Rc illustrated in FIG. 2 (Step iii), and which has been detected by the structure region detection means 11. Further, as illustrated in FIG. 2 (Step iv), the tree structure candidate extraction means 12 performs thinning on the obtained candidate region Rc by using a known method. Further, as illustrated in FIG. 2 (Step v), the tree structure candidate extraction means 12 divides the thinned lines at branching points. Further, the tree structure candidate extraction means 12 defines the branching points and end points, as plural nodes, and extracts a candidate of a tree structure representing the portal vein and a candidate of a tree structure representing the hepatic veins by defining divided segments, as plural edges. The thinned lines may be divided not only at the branching points, but also based on a predetermined condition, such as a predetermined interval. Such a predetermined condition is used to appropriately divide a gradually curved part of the thinned lines into plural segments along the curve.

The method for extracting the first linear structure and the second linear structure, as candidates of tree structures, is not limited to the aforementioned method. Any known method is adoptable as long as a linear structure can be extracted as a candidate of a tree structure defined by plural nodes and plural edges.

Figure 3A:
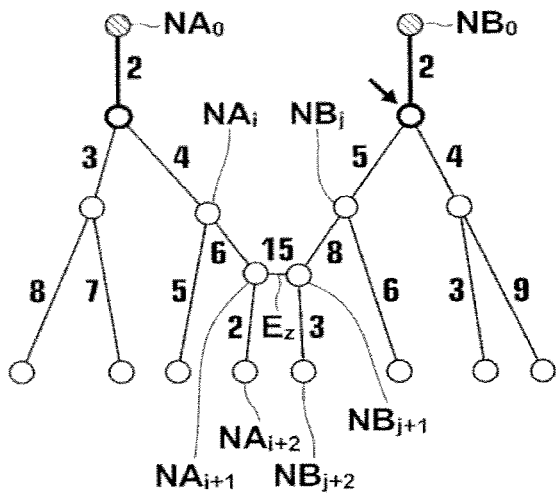
FIG. 3A is a diagram (No. 1) for explaining a method for creating a first tree structure and a second tree structure in the first embodiment.

FIG. 3A is a so-called image diagram illustrating a candidate of a tree structure representing a portal vein and a candidate of a tree structure representing hepatic veins, extracted by the tree structure candidate extraction means 12. As illustrated in FIG. 3A, when plural linear structures such as a portal vein and hepatic veins, which extend close to each other in such a manner that they are entangled or intermingled with each other, are extracted as candidates of tree structures by using a known method, there has been a problem of erroneous connection. Specifically, in the candidates of tree structures, a node belonging to a tree structure representing a linear structure is erroneously connected to the other tree structure representing a different linear structure at a portion in which the two linear structures are located extremely close to each other. As illustrated in FIG. 3A, node $NA_{i+1}$ representing a tree structure of a portal vein and node $NB_{j+1}$ representing a tree structure of a hepatic veins, which should not be originally connected to each other, are erroneously connected to each other by edge $E_z$.

However, in the present invention, weighting is performed based on a geometric characteristic that a linear structure, such as a portal vein and hepatic veins, repeatedly branches from an origin and extends in directions away from the origin in such a manner to become wider. Weighting is performed, with respect to each of nodes, by using a cost function that weights a cost representing a probability of connection of each of plural edges connectable to each of the node based on each of the first root node and the second root node. Accordingly, weighting is performed in such a manner that a probability that edge $E_z$ (erroneous connection edge $E_z$) that is erroneously connected, and which does not have the aforementioned geometric characteristic, is connected to any one of the first tree structure and the second tree structure is low.

In the present embodiment, the aforementioned geometric characteristic is regarded, in the weighting operation, as a characteristic that edges to be connected to each node are oriented in such a manner that edges other than a root-node-side edge, which is connected to the root-node-side of each node, extend in directions away from the root node. Further, the geometric characteristic is regarded as a characteristic that among edges to be connected to each node, edges extending in directions away from a root node are oriented substantially in the same direction away from the root node. Here, the phrase "substantially in the same direction" means that the directions are not extremely different from each other. For example, the directions in which the edges extend are not opposite to each other (directions close to 180 degrees), or the like.

From this viewpoint, with respect to plural edges connecting each node and nodes connectable to the node, when edges other than the root-node-side edge (the edge connected to the root node side), and which extend in directions away from the root node side, extend substantially in the same direction, the plural edges satisfy the aforementioned geometric characteristic. Therefore, it is estimated that a probability that the node and a root-node-side node of the node should be correctly connected to each other is high. In contrast, when edges other than the root-node-side edge (edge connected to the root node side), and which extend in directions away from the root node side, extend indifferent directions from each other, the plural edges do not satisfy the aforementioned geometric characteristic. Therefore, it is estimated that a probability that the node and the root-node-side node of the node are erroneously connected to each other is high.

Further, weighting is performed, based on the estimation, in such a manner that a probability of connection of a root-node-side edge to the node is higher as edges extending from the node in directions away from the root node side extend in the same direction more substantially (which means that the degree of the sameness in directions is higher). Specifically, the cost of the root-node-side edge of a node is set in such a manner that a probability that the root-node-side edge is connected to the node is higher as an angle between edges extending from the node in directions away from the root node is smaller.

Figure 4:
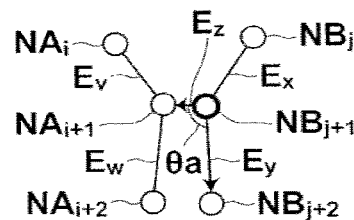
FIG. 4 is a diagram for explaining a method for calculating a cost between nodes by a tree structure creation means in the first embodiment (a case of calculating a cost with respect to an erroneously connected root-node-side edge)
Figure 5:
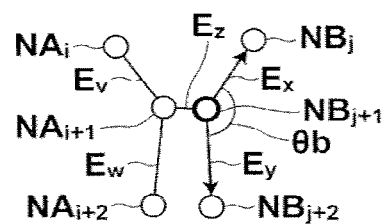
FIG. 5 is a diagram for explaining a method for calculating a cost between nodes by a tree structure creation means in the first embodiment (a case of calculating a cost with respect to a root-node-side edge to be correctly connected)

Next, with reference to FIGS. 4 and 5, the principle of weighting in such a manner that the erroneously connected edge between the first tree structure and the second tree structure is not likely to be connected will be further described. In FIGS. 4 and 5, a part of FIG. 3A in which node $NA_i$ constituting the first tree structure and node $N_{j+1}$ constituting the second tree structure are erroneously connected to each other is enlarged.

A case in which the tree structure creation means 13 determines, with respect to node $NB_{j+1}$, the cost of edge $E_x$ connecting the node $NB_{j+1}$ to node $NB_j$ connectable to the node $NB_{j+1}$ will be described. As illustrated in FIG. 4, the tree structure creation means 13 weights root-node-side edge $E_x$ based on angle θa between edges $E_y$, $E_z$ that are other than the root-node-side edge $E_x$ (root-node-side with respect to second-root-node $NB_0$). In the present embodiment, angle θa formed by a vector from node $NB_{j+1}$ toward node $NA_{i+1}$ and a vector from node $NB_{j+1}$ toward node $NB_{j+2}$ is defined by an inner product of the vector from node $NB_{j+1}$ toward node $NA_{i+1}$ and the vector from node $NB_{j+1}$ toward node $NB_{j+2}$.

With reference to FIG. 5, a case in which the tree structure creation means 13 determines, with respect to node $NA_{i+1}$, the cost of edge $E_z$ connecting the node $NA_{i+1}$ to node $NB_{j+1}$ connectable to the node $NA_{i+1}$ will be described. The tree structure creation means 13 weights root-node-side edge $E_z$ also based on angle θb between edges $E_y$, $E_x$ that are other than the root-node-side edge $E_z$ (root-node-side with respect to first-root-node $NA_0$). Here, angle θb formed by a vector from node $NB_{j+1}$ toward node $NB_{j+2}$ and a vector from node $NB_{j+1}$ toward node $NB_j$ is defined by an inner product of the vector from node $NB_{j+1}$ toward node $NB_{j+2}$ and the vector from node $NB_{j+1}$ toward node $NB_j$.

The erroneously connected edge $E_z$, which connects a node belonging to the first tree structure and a node belonging to the second tree structure to each other, does not have the geometric characteristic that each of the first linear structure and the second linear structure repeatedly branches from an origin and extends in directions away from the origin in such a manner to become wider. Therefore, the angle θb is relatively larger than the angle θa. Specifically, the angle θa is formed by edges $E_z$ and $E_y$ connectable to the root-node-side edge $E_x$ (root-node-side with respect to the second root node, and the edge follows the aforementioned geometric characteristic), and the angle θb is formed by edges $E_x$ and $E_y$ connectable to the root-node-side edge $E_z$ (root-node-side with respect to the first root node, and the edge is erroneously connected).

In the present embodiment, weighting is performed in such a manner that a probability of connection of a root-node-side edge is higher as an angle between edges other than the root-node-side edge is smaller. Therefore, weighting is performed in such a manner that the root-node-side edge $E_z$ that is connected from the first root node (the root node of the erroneously connected tree structure) side is less likely to be connected than the root-node-side edge $E_x$. As described above, in the present embodiment, weighting is performed by the cost function in such a manner that a probability of connection of the erroneously connected edge $E_z$, which connects a node belonging to the first tree structure and a node belonging to the second tree structure, is low, because the edge $E_z$ does not have the geometric characteristic that each of the first linear structure and the second linear structure repeatedly branches from an origin and extends in directions away from the origin in such a manner to become wider. In contrast, other edges that have the geometric characteristics of the first tree structure and the second tree structure follow the geometric characteristic. Therefore, weighting is performed in such a manner that a probability of connection of such edges having the geometric characteristics is relatively high.

In the present embodiment, when plural edges extending from a root-node-side edge are present, weighting on the root-node-side edge is performed based on a maximum angle among angles between the plural edges.

Further, the tree structure creation means 13 sequentially scans nodes connectable from the first root node $NA_0$ and the second root node $NB_0$, and calculates a cost with respect to each of the connectable nodes by using the aforementioned cost function. In the present embodiment, an origin of a portal vein and an origin of hepatic veins are selected by a manual operation on a display screen of medical image data by using an input device, such as a mouse, and the coordinate values of the positions of the origins are obtained. Further, the first root node $NA_0$ corresponding to the origin of the portal vein and the second root node $NB_0$ corresponding to the origin of the hepatic veins are identified based on the obtained coordinate values.

Further, the tree structure creation means 13 of the present embodiment calculates, as a cost, an index value representing a probability of connection between nodes from each of the first root node corresponding to the root node in the first tree structure and the second root node corresponding to the root node in the second tree structure. Further, the tree structure creation means 13 connects the nodes again based on the calculated costs, and creates a tree structure by Prim's algorithm, which is a kind of minimum spanning tree algorithm.

The expression "create a tree structure by connecting each node from each of the first root node corresponding to the root node in the first tree structure and the second root node corresponding to the root node in the second tree structure" means that both of the root node in the first tree structure and the root node in the second tree structure are used as roots, and that connection of nodes that has a highest probability of connection is determined based on each cost calculated for each node connectable to each node constituting the first tree structure and each cost calculated for each node connectable to each node constituting the second tree structure. In contrast, in conventional methods, the first root node (or the second root node) is used as a root, and connection is determined by comparing costs between connectable nodes only with respect to the first tree structure (or the second tree structure).

Figure 3B:
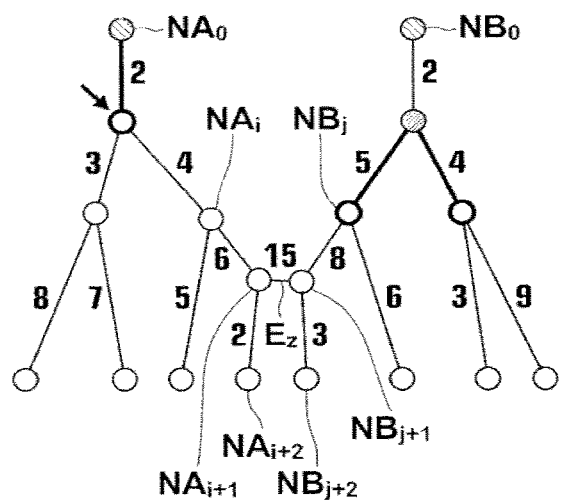
FIG. 3B is a diagram (No. 2) for explaining a method for creating a first tree structure and a second tree structure in the first embodiment.
Figure 3C:
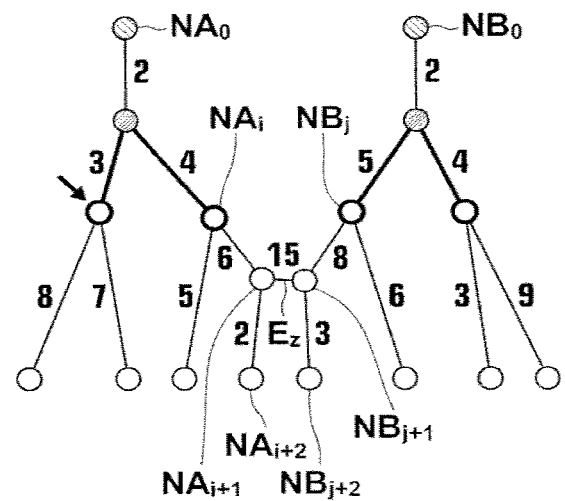
FIG. 3C is a diagram (No. 3) for explaining a method for creating a first tree structure and a second tree structure in the first embodiment.
Figure 3D:
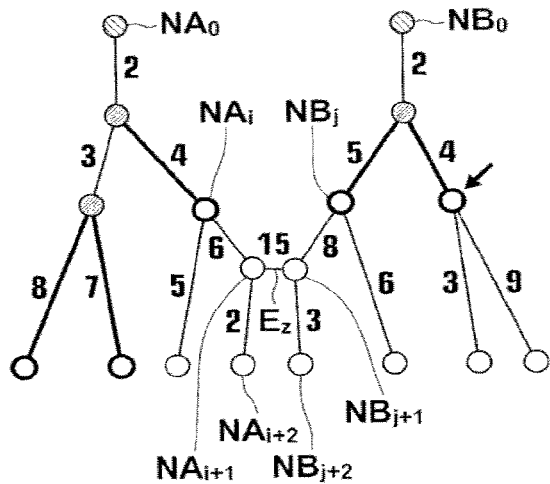
FIG. 3D is a diagram (No. 4) for explaining a method for creating a first tree structure and a second tree structure in the first embodiment.
Figure 3E:
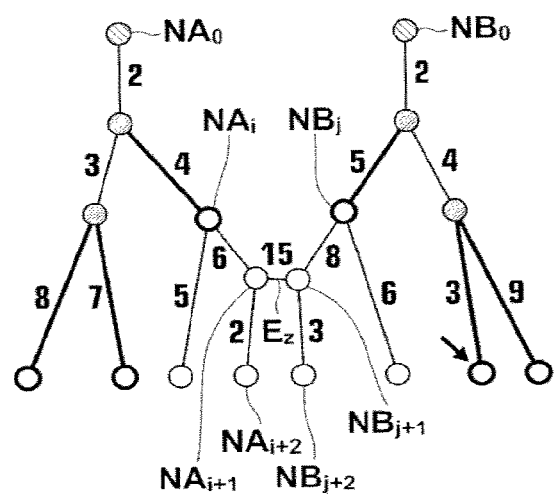
FIG. 3E is a diagram (No. 5) for explaining a method for creating a first tree structure and a second tree structure in the first embodiment.
Figure 3F:
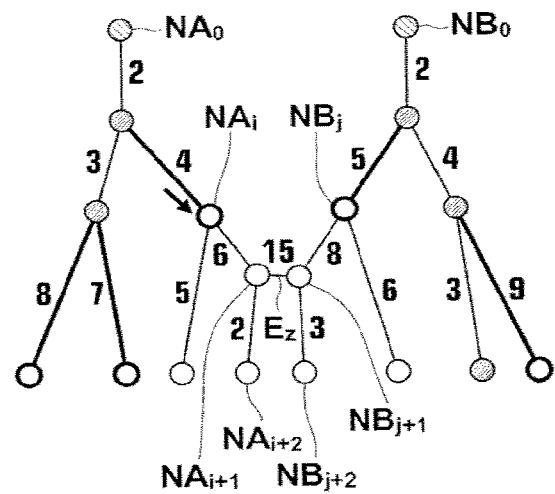
FIG. 3F is a diagram (No. 6) for explaining a method for creating a first tree structure and a second tree structure in the first embodiment.
Figure 3G:
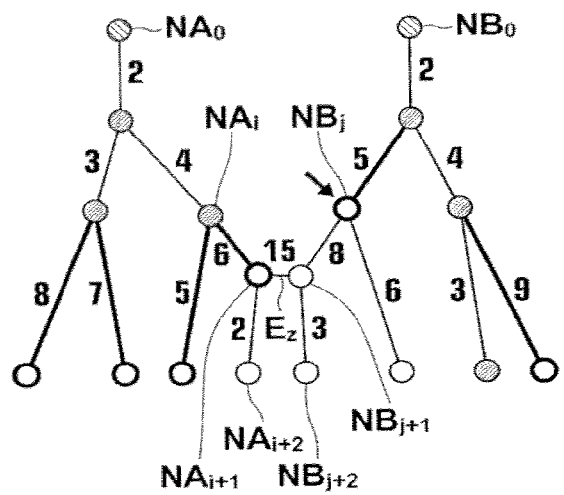
FIG. 3G is a diagram (No. 7) for explaining a method for creating a first tree structure and a second tree structure in the first embodiment.
Figure 3H:
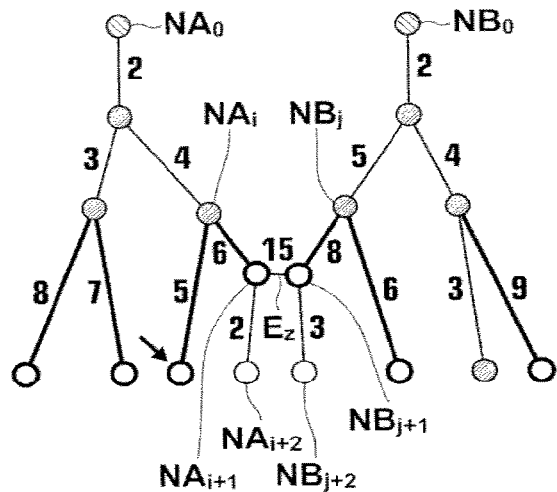
FIG. 3H is a diagram (No. 8) for explaining a method for creating a first tree structure and a second tree structure in the first embodiment.
Figure 3I:
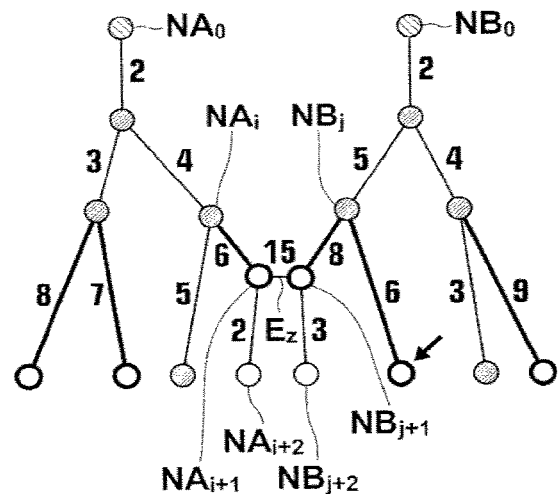
FIG. 3I is a diagram (No. 9) for explaining a method for creating a first tree structure and a second tree structure in the first embodiment.
Figure 3J:
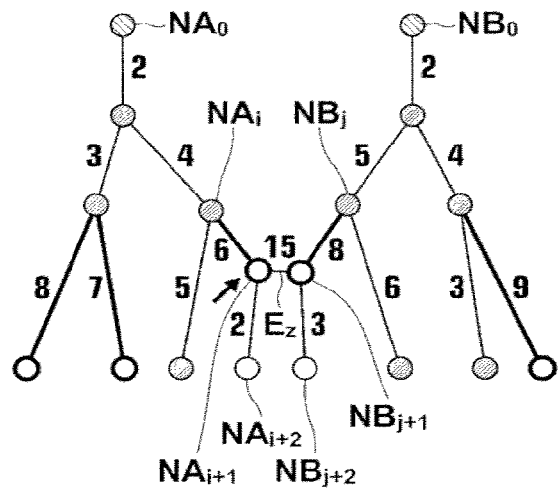
FIG. 3J is a diagram (No. 10) for explaining a method for creating a first tree structure and a second tree structure in the first embodiment.
Figure 3K:
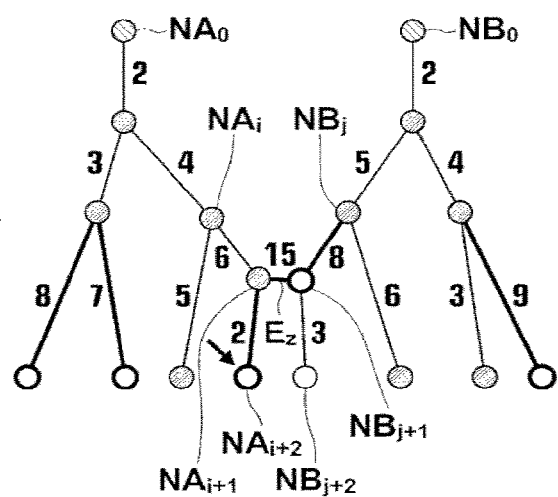
FIG. 3K is a diagram (No. 11) for explaining a method for creating a first tree structure and a second tree structure in the first embodiment.
Figure 3L:
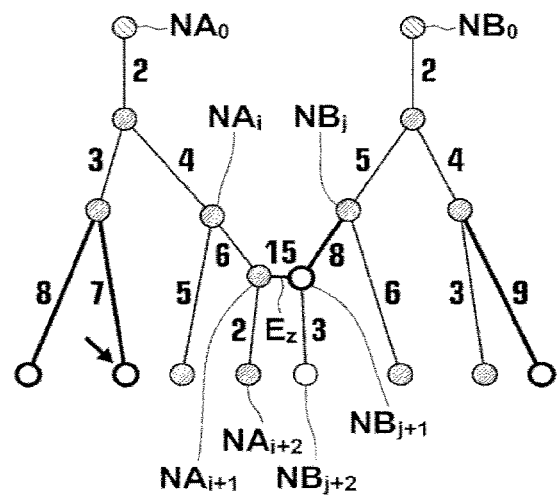
FIG. 3L is a diagram (No. 12) for explaining a method for creating a first tree structure and a second tree structure in the first embodiment.
Figure 3M:
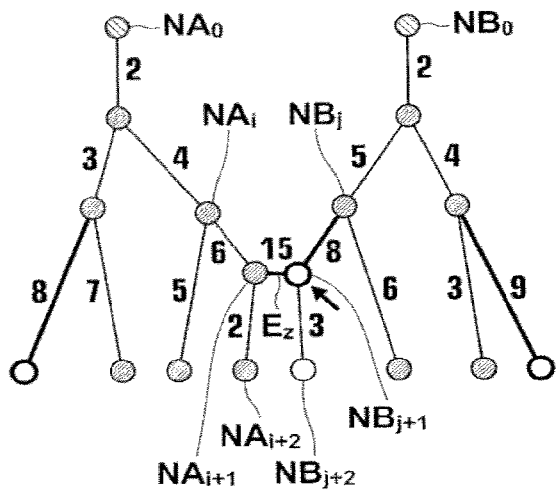
FIG. 3M is a diagram (No. 13) for explaining a method for creating a first tree structure and a second tree structure in the first embodiment.
Figure 3N:
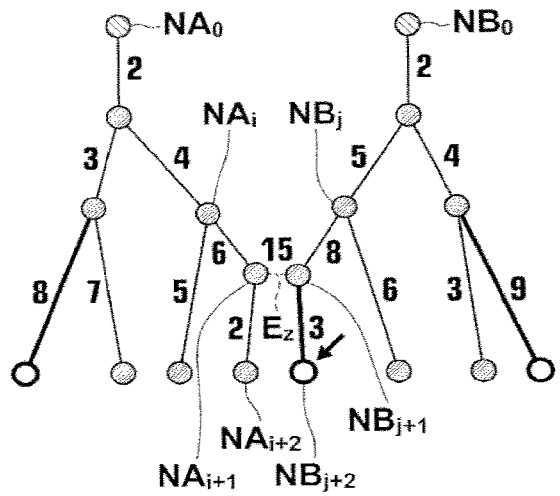
FIG. 3N is a diagram (No. 14) for explaining a method for creating a first tree structure and a second tree structure in the first embodiment.
Figure 3O:
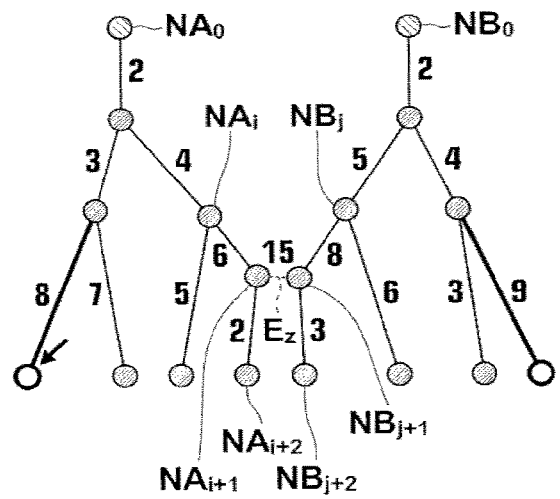
FIG. 3O is a diagram (No. 15) for explaining a method for creating a first tree structure and a second tree structure in the first embodiment.
Figure 3P:
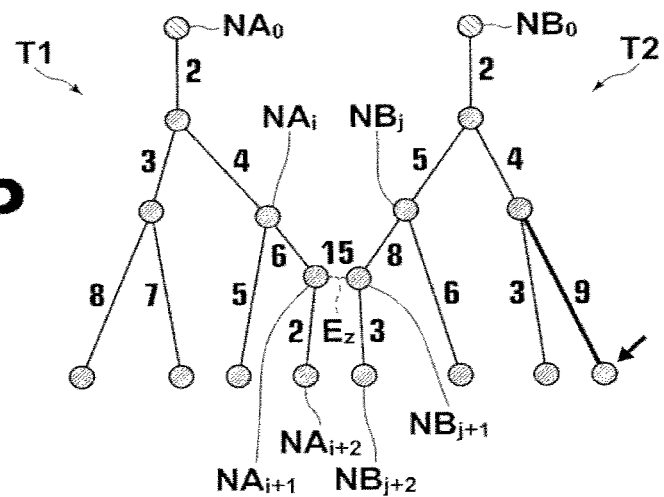
FIG. 3P is a diagram (No. 16) for explaining a method for creating a first tree structure and a second tree structure in the first embodiment.

With reference to FIGS. 3A through 3P, a method for connecting, based on costs calculated by the cost function, connectable nodes in each of the first tree structure and the second tree structure sequentially from the first root node $NA_0$ and the second root node $NB_0$, respectively, will be described specifically. In FIGS. 3A through 3P, a node the connection of which has been determined (solved node) in the first linear structure or the second linear structure is indicated by a shaded circle. Further, anode that is connectable to the solved node, but the connection of which has not been determined (unsolved node) is indicated by a thick-outlined white circle. A cost of each edge between nodes connectable to each other is calculated by using the cost function. In FIGS. 3A through 3P, the calculated cost of each edge connecting the nodes is represented by a numerical value. Here, for the purpose of explanation, the numerical values representing the costs differ from actual calculated values. In FIGS. 3A through 3P, a cost of each of all the edges is written. However, this does not mean the costs for all of the edges are calculated in advance before each node constituting the tree structures is scanned. In the present embodiment, costs for edges between connectable nodes are sequentially calculated for each node as the tree structure is scanned, and the calculated costs are compared with each other.

In FIG. 3A, first, node $NA_0$ and node $NB_0$ are determined as a root node in the first tree structure and a root node in the second tree structure, respectively (solved state). Meanwhile, connection of all of nodes other than the node $NA_0$ and the node $NB_0$ is not determined (unsolved state). As illustrated in FIG. 3A, a node connectable to the node $NA_0$ and a node connectable to the node $NB_0$ are present. The tree structure creation means 13 calculates a cost of an edge connecting the node $NA_0$ to the connectable node and a cost of an edge connecting the node $NB_0$ to the connectable node, and compares the calculated costs with each other. In FIG. 3A, the cost of the edge connectable from the node $NA_0$ and the cost of the edge connectable from the node $NB_0$ are 2 and 2, which are the same. When the costs for the edges are the same, a connection relationship of a node connected to either one of the edges may be determined first. Hereinafter, for the convenience of explanation, when the values of the costs are the same, the connection relationship of a node connected to an edge in a right-side tree structure will be determined first. Accordingly, connection between a node indicated by a thick arrow, in which the cost is the smallest, and the second root node $NB_0$ is determined (the node indicated by the thick arrow is solved).

Next, in FIG. 3B, a cost for each node connectable from the node that has been just solved (the node indicated by an arrow in FIG. 3A), and a cost for each node connectable from the first root node $NA_0$, which has been solved, are calculated, and the calculated costs are compared with each other (please refer to thick-outlined circles in FIG. 3B). Specifically, in FIG. 3R, the cost of each edge represented by a thick line is calculated, and the calculated costs are compared with each other. The edges represented by thick lines connect each of the solved nodes (the node indicated by an arrow in FIG. 3A and first root node $NA_0$) to each node indicated by a thick-outlined circle. Then, the costs of edges connectable to the node that has been just solved are 5 and 4 from the left side. Further, the cost of an edge connectable to the first root node $NA_0$ is 2. Therefore, connection between the node indicated by the thick arrow and the first root node $NA_0$ in which the cost is the smallest is determined (the node indicated by the thick arrow is solved).

Similarly, in FIG. 3C, a cost for each node (please refer to thick-outlined circles in FIG. 3C) connectable to each of the two solved nodes (the nodes indicated by thick arrows in FIGS. 3A and 3B) is calculated, and the calculated costs are compared with each other. In other words, the costs of the edges represented by thick lines are calculated, and compared with each other. The costs of the edges represented by the thick lines are 3, 4, 5 and 4 from the left side. Therefore, connection between the smallest-cost node indicated by the thick arrow and the node (solved node) located on the upper right side of the smallest-cost node in FIG. 3C is determined.

Similarly, in FIGS. 3D through 3J, connection between nodes in the first tree structure and the second tree structure is determined.

Next, in FIG. 3K, node $NA_{i+1}$ in the first tree structure is a solved node. Therefore, a probability of connection is compared also with respect to connection between the node $NA_{i+1}$ in the first tree structure and node $NB_{j+1}$ in the second tree structure, which has been erroneously judged to be connectable to the node $NA_{i+1}$. Specifically, the cost of each of edges indicated by thick lines, including edge $E_z$, is calculated, and the calculated costs are compared with each other. The edge $E_z$ erroneously connects node $NA_{i+1}$ in the first tree structure to node $NB_{j+1}$ in the second tree structure. Here, connection between the node $NA_{i+1}$ (solved node) and node $NA_{i+2}$ indicated by a thick arrow is determined, because the cost of the edge connecting these nodes is 2, which is the smallest among all of connectable edges. Meanwhile, the cost of the edge $E_z$, which connects the node $NA_{i+1}$ in the first tree structure and the node $NB_{j+1}$ in the second tree structure is 15, which is large. Therefore, it is possible to suppress connection of the edge $E_z$.

Further, in FIGS. 3L through 3M, connection between nodes in the first tree structure and the second tree structure is determined. Even during this process, it is possible to suppress connection of the edge $E_z$ because the cost of the edge $E_z$, which connects the node $NA_{i+1}$ in the first tree structure and the node $NB_{j+1}$ in the second tree structure, is large.

Here, in FIG. 3M, connection between node $NB_{j+1}$ and node $NB_{j+2}$ is determined. Therefore, in FIG. 3N, the node $NB_{j+1}$ in the second tree structure is a solved node. Hence, in FIG. 3N, the cost of each of edges indicated by thick lines, including edge $E_y$, is calculated, and the calculated costs are compared with each other. The edge $E_y$ connects node $NB_{j+1}$ in the second tree structure to node $NB_{j+2}$ in the second tree structure, which should be correctly connected to the node $NB_{j+1}$. Accordingly, connection between the node $NB_{j+1}$ (solved node) and node $NB_{j+2}$ indicated by a thick arrow is determined. The cost of the edge connecting these nodes is the smallest among all of connectable edges. Here, both of the node $NA_{i+1}$ in the first tree structure and the node $NB_{j+1}$ in the second tree structure are solved nodes. Therefore, edge $E_z$, which includes the node $NA_{i+1}$ in the first tree structure and the node $NB_{j+1}$ in the second tree structure, is not a target of comparison of cost anymore.

Similarly, in FIG. 3O, with respect to each of nodes connectable to solved nodes in the first tree structure and the second tree structure, costs of edges connecting the solved nodes to the connectable nodes are calculated, and the calculated costs are compared with each other. As a thick arrow indicates, connection between a solved node and a node connectable to the solved node, in which a cost is the smallest, is determined. Further, as illustrated in FIG. 3P, connection is determined also with respect to the last node. Accordingly, first tree structure T1 and second tree structure T2 are created by the tree structure creation means 13 of the present embodiment. Finally, it is possible to create the first tree structure and the second tree structure without connecting the edge $E_z$, which connects the node $NA_{i+1}$ belonging to the first tree structure to the node $NB_{j+1}$ belonging to the second tree structure.

FIG. 6 is a diagram illustrating portal vein M1 and hepatic veins M2 extracted based on tree structures T1, T2 created by the aforementioned processing, respectively. As illustrated in FIG. 6, the display control means 14 displays the portal vein M1 and the hepatic veins M2 on a display 3 by using a known method. The portal vein M1 and the hepatic veins M2 are displayed based on tree structures T1, T2 created by the tree structure creation means 13.

As described above, according to the present embodiment, tree structures are created by connecting nodes from the first root node corresponding to the root node in the first tree structure and the second root node corresponding to the root node in the second tree structure, respectively, based on the characteristic that each of the tree structures repeatedly branches from an origin and extends in directions away from the origin in such a manner to become wider. Tree structures are created by reevaluating a probability of connection between nodes in the tree structures by utilizing the geometric characteristic that each of the tree structures repeatedly branches from an origin and extends in directions away from the origin in such a manner to become wider. Therefore, even if structures, such as a portal vein and hepatic veins in a liver, branch many times, and branches of blood vessels in the structures run close to each other in such a manner that they are entangled or intermingled with each other, it is possible to suppress erroneous connection of nodes between different structures at a part of the structures in which the first structure and the second structure are located close to each other. Consequently, it is possible to efficiently and accurately create the first tree structure and the second tree structure.

When the first tree structure and the second tree structures are created separately as in conventional methods, even if weighting is performed in such a manner that a probability of erroneous connection edge $E_z$, which erroneously connects a node belonging to the first tree structure to a node belonging to the second tree structure, is low, erroneous connection occurs. Specifically, connection between nodes is determined in the order of probability of connection from the highest probability of connection. Therefore, by the end of processing, connection is determined even for nodes that have been weighted at a low probability of connection (a tree structure is created by connecting nodes by the erroneous connection edge $E_z$). However, in the aforementioned method of the present invention, the tree structures are created based on two root nodes, respectively. Therefore, with respect to edge $E_z$, which connects node $NA_{i+1}$ belonging to the first tree structure and node $NB_{j+1}$ belonging to the second tree structure to each other, when a probability of connection is reevaluated with respect to the node $NA_{i+1}$ in the first tree structure, which is one of the structures, from the root side of the first tree structure, priority is given to determination of edges other than the erroneous connection edge $E_z$ that has been weighted at a low probability of connection. Accordingly, connection of the node $NA_{i+1}$ in the first tree structure is determined. When a probability of connection is reevaluated with respect to the node $NB_{j+1}$ in the second tree structure, which is the other one of the structures, from the root side of the second tree structure, erroneous connection edge $E_z$, which connects the node $NA_{i+1}$ belonging to the first tree structure and the node $NB_{j+1}$ belonging to the second tree structure to each other, is not a target of reevaluating a probability of connection, because connection of the node $NA_{i+1}$ in the first tree structure has been determined (solved node). Therefore, the two tree structures are not erroneously connected to each other by erroneous correction edge $E_z$, and it is possible to accurately create each of the first tree structure and the second tree structure.

Further, the characteristic that each of tree structures repeatedly branches from an origin and extends in directions away from the origin in such a manner to become wider is regarded, as a characteristic that among edges to be connected to each node, edges other than a root-node-side edge, which is connected to the root-node-side of each node, are oriented substantially in the same direction away from the root node. It is possible to accurately create the first tree structure and the second tree structure by weighting a probability of connection between the nodes based on such a viewpoint.

Further, in the first embodiment, weighting is performed in such a manner that a probability that the root-node-side edge of a node is connected to the node is higher as the edges extending from the node in directions away from the root node side, and which are the edges other than the root-node-side edge, extend in the same direction more substantially (which means that the degree of the sameness in directions is higher). Accordingly, it is possible to appropriately suppress connection between the first tree structure and the second tree structure.

Further, in the first embodiment, the characteristic that among edges connectable to each node, plural edges other than a root-node-side edge, which is connected to the root-node-side of each node, are oriented substantially in the same direction away from the root node is defined by an angle between the plural edges connectable to each node other than the root-node-side edge. Further, weighting is performed in such a manner that a probability of connection of the root-node-side edge is higher as the angle is smaller. Therefore, it is possible to easily and appropriately create the tree structure by weighting a probability of connection of each node based on the characteristic. Further, when the angle is defined by an inner product, it is possible to easily and appropriately create the tree structure by weighting a probability of connection of each node based on the characteristic.

Further, any spanning tree algorithm may be adopted to create the tree structure as long as nodes are connectable to each other in such a manner that the strength of connection between the nodes becomes high by calculating an index value representing the strength of connection between the nodes as a cost for each node. Specifically, an index value representing the strength of connection between nodes is calculated for each node from each of the first root node corresponding to the root node in the first tree structure and the second root node corresponding to the root node in the second tree structure, respectively. For example, Prim's algorithm may be adopted as the spanning tree algorithm.

Further, the cost function used in the first embodiment is not limited. Any cost function may be used in the present invention as long as the cost function is based on the geometric characteristic that each of tree structures repeatedly branches from an origin and extends in directions away from the origin in such a manner to become wider, and performs weighting in such a manner that a probability of connection of edge $E_z$ (erroneous connection edge $E_z$) to either the first tree structure or the second tree structure is low. The edge $E_z$ does not have such a geometric characteristic, and has been erroneously connected. Further, weighting by the cost function may be performed on connection between all of the nodes before each of the tree structures is scanned. Alternatively, when connectable nodes are sequentially scanned from each of root nodes, a cost may be calculated each time for each of the nodes.

The present invention is not limited to the first embodiment. The aforementioned characteristic may be defined by using any method as long as the method represents the characteristic that among edges connectable to each node, plural edges other than a root-node-side edge are oriented substantially in the same direction. In the aforementioned embodiment, it is not necessary that the angle between plural edges connectable to each node is defined by an inner product. The angle may be defined by an arbitrary method representing the angle.

Figure 8A:
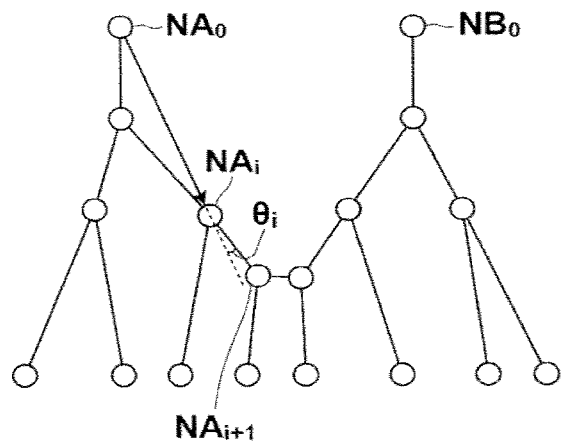
FIG. 8A is a diagram (No. 1) for explaining a method for detecting a candidate of a node constituting the second linear structure in the second embodiment.
Figure 8B:
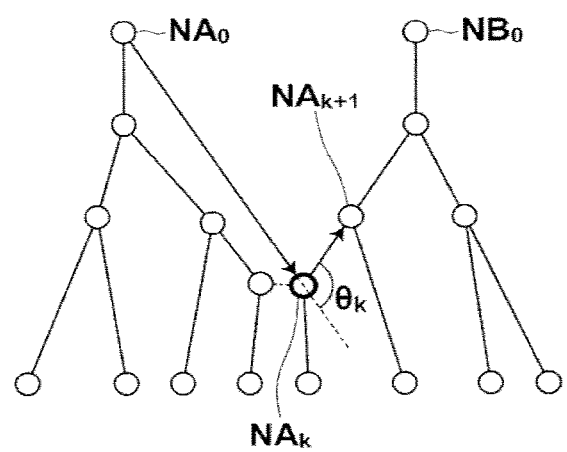
FIG. 8B is a diagram (No. 2) for explaining a method for detecting a candidate of a node constituting the second linear structure in the second embodiment.
Figure 9:
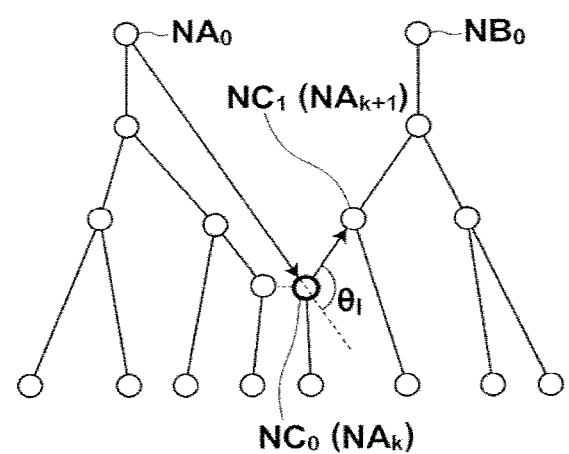
FIG. 9 is a diagram for explaining a method for detecting a second root node in the second embodiment.

Next, with reference to FIGS. 7 through 9, a second embodiment of the present invention will be described. The second embodiment differs from the first embodiment in that a candidate of a second tree structure node that constitutes the second tree structure, and which has been erroneously connected to the first tree structure, is detected, and a root node of the second tree structure is detected based on the candidate of the second tree structure node. Features of the second embodiment different from those of the first embodiment will be mainly described, and explanations of the same features will be omitted. FIG. 7 is a functional block diagram of the second embodiment. FIGS. 8A and 8B are diagrams for explaining processing for extracting a candidate of a second tree structure node. FIG. 9 is a diagram for explaining processing for detecting the second root node based on the candidate of the second tree structure node.

As illustrated in FIG. 7, the tree structure extraction apparatus 1 in the second embodiment differs from the tree structure extraction apparatus 1 in the first embodiment in that the tree structure extraction apparatus 1 in the second embodiment includes a second tree structure node candidate detection means 15 and a root node detection means 16. The second tree structure node candidate detection means 15 extracts, from medical image data, a first linear structure as a provisional tree structure defined by plural nodes including a first root node and plural edges, and detects, with respect to each of the plural nodes, a node connected to an edge extending in a direction closer to the first root node from the node in a manner contrary to the characteristic that the first linear structure repeatedly branches from the origin and extends in directions away from the origin in such a manner to become wider, as a candidate of a node constituting the second tree structure, based on an angle between a segment connecting the first root node and each of the plural nodes and each edge connecting each of the plural nodes connected to the first root node and a node connectable to the node, in the extracted provisional tree structure. Further, the root node detection means 16 detects the second root node based on the detected candidate of a node constituting the second tree structure.

Next, with reference to FIGS. 8A and 8B, a principle of a method for detecting a candidate of a second tree structure node by the second tree structure node candidate detection means 15 will be described. FIG. 8A is a diagram illustrating candidates of tree structures representing a portal vein and hepatic veins extracted by the tree structure candidate extraction processing in the first embodiment.

Here, the geometric characteristic that a predetermined structure, such as a portal vein in a liver, repeatedly branches from the origin and extends in directions away from the origin in such a manner to become wider is further regarded as a characteristic that with respect to each node, angle $\theta_i$ formed by a segment connecting root node $NA_0$ and each node $NA_i$ and an edge between the node $NA_i$ and node $NA_{i+1}$, which is next to the node $NA_i$ in a direction away from the root node $NA_0$, is less than a predetermined angle in a tree structure representing the portal vein, as illustrated in FIG. 8A.

Further, the angle $\theta_i$ is judged by an inner product, as represented by the following formula (1), and the formula (1) is defined as cost function f. A cost is calculated for each of plural nodes constituting the tree structure candidate extracted by the tree structure candidate extraction means 12. The cost is calculated, by using the formula (1), in such a manner that a probability of connection between each node $NA_i$ and node $NA_{i+1}$ is higher as angle $\theta_i$ is smaller. Weighting is performed on edges between nodes, and a candidate of a tree structure is provisionally created. In the present embodiment, the position of an origin of a portal vein is selected by a manual operation at an input device, such as a mouse, as described above, and the selected position of the origin is input as root node $NA_0$ corresponding to the origin of the portal vein.

[Formula 1]

$$f_i = \frac{\overrightarrow{NA_0\ NA_i} \cdot \overrightarrow{NA_i\ NA_{i+1}}}{|\overrightarrow{NA_0\ NA_i}||\overrightarrow{NA_i\ NA_{i+1}}|}. \tag{1}$$

Next, the second tree structure node candidate detection means 15 determines an optimal path in such a manner to obtain max$\Sigma$f by using a known minimum spanning tree algorithm. Further, the second tree structure node candidate detection means 15 creates a tree structure for detecting a second tree structure node candidate, as a provisional tree structure. Various kinds of known method for creating a tree structure based on a cost function that evaluates the cost of each node may be used. For example, a provisional tree structure may be created by determining an optimal path in such a manner to obtain max$\Sigma$f by using a known spanning tree creation algorithm, such as a minimum spanning tree algorithm or a shortest path tree algorithm.

Further, the second tree structure node candidate detection means 15 detects, as a candidate of anode constituting the second tree structure, node $NA_k$ that is connected to node $NA_{k+1}$ in a direction closer to the first root node, as illustrated in FIG. 8B. The $NA_k$ is connected to node $NA_{k+1}$ in a manner contrary to the characteristic that the first linear structure repeatedly branches from the origin and extends in directions away from the origin in such a manner to become wider.

Here, the second tree structure node candidate detection means 15 judges that a direction from node $NA_k$ to node $NA_{k+1}$ is a direction closer to the first root node when a value obtained by the formula (1) is less than or equal to a predetermined threshold value in the provisional tree structure. In the present embodiment, when f is less than or equal to $-\frac{1}{2}$, it is judged that the direction from node $NA_k$ to node $NA_{k+1}$ is a direction approaching or closer to the first root node. The threshold value for judging whether the direction from node $NA_k$ to node $NA_{k+1}$ is a direction closer to the first root node may be arbitrarily set for each user, for example, in such a manner that angle $\theta_k$ formed by a segment connecting node $NA_0$ and node $NA_k$ to each other and an edge connecting node $NA_k$ and node $NA_{k+1}$ to each other is in the range of from 90 to 180 degrees.

Then, the root node detection means 16 in the second embodiment obtains candidate $NA_k$ of a node constituting the second tree structure, which has been detected by the second tree structure node candidate detection means 15. Further, the root node detection means 16 in the second embodiment detects the second root node based on the characteristic that an origin of a portal vein and an origin of hepatic veins are located close to each other. The root node detection means 16 in the second embodiment detects the second root node, based on an angle between a segment connecting the first root node and each node and each edge connecting each node connected to the first root node and a node connectable to the node, by sequentially searching nodes located in a direction approaching the first root node corresponding to the first linear structure from the candidate of a node constituting the second tree structure.

Next, with reference to FIG. 9, a principle of a method for detecting a second root node by the root node detection means 16 will be described. FIG. 9 is a diagram illustrating candidates of tree structures representing a portal vein and hepatic veins, which have been extracted by the tree structure candidate extraction processing in the first embodiment.

The inventor of the present invention has noted that a root node of a second tree structure is detectable based on the geometric characteristic that a linear structure, such as a portal vein and hepatic veins, in a liver repeatedly branches from an origin and extends in directions away from the origin in such a manner to become wider, and the characteristic that the origin of the portal vein and the origin of the hepatic veins are located substantially close to each other. The inventor has noted that the root node of the second tree structure is detectable, based on the characteristics, by searching the candidate of the tree structure in a direction approaching the root node of the first tree structure from a node constituting the second tree structure, as illustrated in FIG. 9.

Further, the inventor of the present invention has found that candidates of tree structures are searchable in a direction approaching the root node of the first tree structure from a candidate of a node constituting the second tree structure by searching nodes in such a manner that angle $\theta_l$ formed by a segment connecting root node $NA_0$ in a portal vein and each node $NC_l$ and an edge connecting the node $NC_l$ and node $NC_{l+1}$, which is located next to the node $NC_l$ in a direction away from the candidate $NC_0(NA_k)$ of a second tree structure node, becomes large, using the candidate $NC_0(NA_k)$ of the second tree structure node as a root node. Here, the root node detection means 16 defines the aforementioned angle by an inner product of the segment connecting the first root node and each node and each edge between each node connected to the first root node and a node connectable to the node.

Further, the angle $\theta_l$ is judged by an inner product, as represented by the following formula (2). It is possible to detect the second root node $NB_0$ by sequentially searching for node $NC_{l+1}$ connectable to node $NC_l$ in such a manner that angle $\theta_l$ becomes large by using the formula (2):

[Formula 2]

$$f_l = \frac{\overrightarrow{NC_0\ NC_l} \cdot \overrightarrow{NC_l\ NC_{l+1}}}{|\overrightarrow{NC_0\ NC_l}||\overrightarrow{NC_l\ NC_{l+1}}|}. \quad (2)$$

According the second embodiment, it is possible to automatically extract second root node $NB_0$ by utilizing the geometric characteristic that the first linear structure repeatedly branches from the origin and extends in directions away from the origin in such a manner to become wider. Therefore, it is possible to reduce a user's operation for selecting second root node $NB_0$ in image data. Further, it is possible to efficiently and accurately create the first tree structure and the second tree structure.

Further, the second tree structure node candidate detection means 15 extracts the first structure, as a provisional tree structure defined by plural nodes including a first root node and plural edges. Further, in the extracted provisional tree structure, the second tree structure node candidate detection means 15 detects, as a candidate of a node constituting the second tree structure, a node connected to an edge extending in a direction closer to the first root node in a manner contrary to the characteristic that the first structure repeatedly branches from the origin and extends in directions away from the origin in such a manner to become wider. The candidate of the node constituting the second tree structure is detected based on an angle formed by a segment connecting the first root node and each of nodes and an edge between each of the nodes connected to the first root node and a node connectable to the node with respect to each of the nodes. Therefore, it is possible to efficiently detect a node that might have been erroneously connected. Further, it is possible to efficiently and accurately create the first tree structure and the second tree structure.

Further, the second tree structure node candidate detection means 15 can easily and appropriately weight a probability of connection of each node, based on the geometric characteristic that a structure repeatedly branches from an origin and extends in directions away from the origin in such a manner to become wider, by defining the geometric characteristic by an inner product of a segment connecting a root node and each of nodes and each edge connecting the node connected to the root node and a node connectable to the node, and create the tree structure.

The root node detection means 16 utilizes the characteristic that the origin of the first structure and the origin of the second structure are located close to each other, and the characteristic that each of the first structure and the second structure repeatedly branches from an origin and extends in directions away from the origin in such a manner to become wider. The root node detection means 16 sequentially searches nodes in a direction approaching the root node corresponding to the first tree structure from a candidate of a node constituting the second tree structure based on an angle formed by a segment connecting a first root node and each of nodes and an edge connecting each of the nodes connected to the first root node and a node connectable to the node. Therefore, it is possible to appropriately detect the second root node.

Further, the root node detection means 16 may define the characteristic that a structure repeatedly branches from an origin and extends in directions away from the origin in such a manner to become wider by an inner product of a segment connecting a root node and each of nodes and each edge connecting the node connected to the root node and a node connectable to the node. Accordingly, the root node detection means 16 can easily and appropriately weight a probability of connection of each node based on the characteristic, and appropriately detect the second root node.

As a practical example of the second tree structure node candidate detection means 15, any evaluation method may be used instead of formula (1) in a tree structure representing a predetermined structure as long as the evaluation method represents a characteristic that a relative angle formed by a segment connecting root node $NA_0$ and each node $NA_i$ and an edge connecting node $NA_i$ and node $NA_{i+1}$, which is next to node $NA_i$ in a direction away from the root node, is small.

The present invention is not limited to the second embodiment. Any formula may be used instead of the formula (1) as long as a probability of connection between nodes is weighted by evaluating a relationship between each node and a root node based on the characteristic that a predetermined structure repeatedly branches from an origin and extends in directions away from the origin in such a manner to become wider. For example, as formula (3) represents, weighting may be performed, based on a difference between the length of a segment connecting a root node and each of nodes and the length of an edge between the node connected to the root node and a node next to the node in a repeatedly-branching direction away from the root node, in such a manner that a probability of connection between the node connected to the root node and a node next to the node is higher as the difference between the lengths is smaller:

[Formula 3]

$$f_i = \frac{|\overrightarrow{NA_0\ NA_{i+1}}| - |\overrightarrow{NA_i\ NA_{i+1}}|}{|\overrightarrow{NA_0\ NA_i}|}. \quad (3)$$

The present invention is not limited the second embodiment. The root node detection means 16 may use any search method as long as the method utilizes, the characteristic that an origin of a first structure and an origin of a second structure are located close to each other, and the characteristic that each of the first structure and the second structure repeatedly branches from an origin and extends in directions away from the origin in such a manner to become wider, and sequentially searches nodes located in a direction approaching a root node corresponding to the first structure from the candidate of the node constituting the second tree structure.

As a practical example of the root node detection means 16, any evaluation method may be used instead of the formula (2) in a tree structure representing a predetermined structure as long as the method represents the characteristic that a relative angle formed by a segment connecting root node $NC_0$ and each node $NC_i$ and an edge connecting node $NC_i$ and node $NC_{i+1}$, which is next to node $NC_i$ in a direction away from the root node, is large.

The present invention is not limited to the second embodiment. Any formula may be used instead of the formula (2) as long as a probability of connection between nodes is weighted by evaluating a relationship between each node and a root node based on the characteristic that a predetermined structure repeatedly branches from an origin and extends in directions away from the origin in such a manner to become wider. For example, as formula (4) represents, weighting may be performed, based on a difference between the length of a segment connecting a root node and each of nodes and the length of an edge between the node connected to the root node and a node next to the node in a direction away from the root node, in such a manner that a probability of connection between the node connected to the root node and anode next to the node is higher as the difference between the lengths is larger:

[Formula 4]

$$f_i = \frac{|\overrightarrow{NC_0\ NC_{i+1}}| - |\overrightarrow{NC_i\ NC_{i+1}}|}{|\overrightarrow{NC_0\ NC_i}|}. \quad (4)$$

In the second embodiment, it is not necessary that the root node detection processing by the root node detection means 16 detects root node $NB_0$ "corresponding to an origin" of the second tree structure. The root node detection processing may detect a root node of a subtree. In this case, it is possible to perform the tree structure creation processing (a subtree of the second structure using the detected root node as a root) of the present invention based on the detected root node of a subtree of the second structure and a first root node. In this case, it is not necessary to perform the tree structure creation processing of the present invention on all of the first tree structure and the second tree structure. Specifically, it is possible to weight a probability of connection in such a manner that a probability of connection of an edge connecting the first structure and the second structure to each other is low by performing the tree structure creation processing of the present invention only on a subtree of the first tree structure including at least the edge connecting the first tree structure and the second tree structure and a subtree of the second tree structure including at least the edge connecting the first tree structure and the second tree structure. Therefore, it is possible to suppress connection between a node belonging to the first tree structure and a node belonging to the second tree structure by an edge that should not connect the nodes. Further, it is possible to accurately extract the first tree structure and the second tree structure.

The present invention is not limited to the aforementioned embodiments. Cost function f may further weight in such a manner that the strength of connection is higher as a distance between nodes is shorter. Further, an arbitrary known weighting method may be used in combination.

As a third embodiment of the present invention, the tree structure creation apparatus 1 may further include an origin detection means, which is not illustrated. The origin detection means detects an origin of a portal vein by performing machine learning on plural sets of training data, each representing a portal vein in which an origin is known. The tree structure creation processing may be performed by obtaining the origin detected by the origin detection means, and by identifying a root node corresponding to the obtained origin by a known method. In this case, it is desirable that the origin detection means can detect both of an origin of the first structure and an origin of the second structure. Alternatively, the origin detection means may detect one of the origin of the first structure and the origin of the second structure. In the third embodiment, Adaboost algorithm is used, and an origin is detected based on the feature value of an origin that is known in training data, and the coordinate value of the origin is obtained in the coordinate system of image data. Further, a root node is identified based on the coordinate value of the origin. In such a case, it is possible to omit a manual operation for inputting the origin. Therefore, it is possible to create a tree structure more efficiently. Further, when the origin is detected by Adaboost algorithm, it is possible to detect the origin in the predetermined structure in a desirable manner. The present invention is not limited to the third embodiment. Various kinds of known method for extracting an origin may be applied to the present invention.

In the descriptions of this specification, a portal vein is used as a predetermined structure. However, the predetermined structure may be any structure as long as the structure is an object from which a shape model is formable, as a tree structure, by using points and edges connecting the points, and the structure has a characteristic that the predetermined structure repeatedly branches from an origin and extends in directions away from the origin in such a manner to become wider. For example, the predetermined structure may be blood vessels in a lung or a liver. Examples of the predetermined structure are a pulmonary artery and a pulmonary vein in a lung, and a portal vein, a hepatic artery and a hepatic vein in a liver.

What is claimed is:

1. A tree structure extraction apparatus that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the apparatus comprising:

a computer and a memory wherein the memory causes the computer to function as a tree structure creation means that creates, based on the medical image data, a candidate of a tree structure defined by a plurality of undetermined nodes representing the first linear structure and the second linear structure and a plurality of undetermined edges connecting the plurality of undetermined nodes, and determines a first root node corresponding to the origin of the first linear structure, as a node constituting the first tree structure, and also a second root node corresponding to the origin of the second linear structure, as a node constituting the second tree structure, in the created candidate of the tree structure, and that compares costs representing probabilities of connection of the undetermined edges connected to the first root node and costs representing probabilities of connection of the undetermined edges connected to the second root node, and selects, as a determined edge, the undetermined edge having the cost representing the highest probability of connection from the edges the costs of which have been compared, and selects, as a determined node, the undetermined node connected to the determined edge, and that repeats processing of comparing costs representing probabilities of connection of all of the undetermined edges connected to the determined nodes, and selecting, as a determined edge, the undetermined edge that has a cost representing the highest probability of connection from the undetermined edges the costs of which have been compared, and selecting, as a determined node, the undetermined node connected to the determined edge, thereby making all of the undetermined nodes in the candidate of the tree structure determined, and creates the first tree structure defined by the determined edges and the determined nodes, and the origin of which is the first root node, and the second tree structure defined by the determined edges and the determined nodes, and the origin of which is the second root node, wherein the costs are weighted in such a manner that a probability of connection of an edge satisfying the characteristic that each of the first linear structure and the second linear structure repeatedly branches from its origin and extends in directions away from the origin in such a manner to become wider is higher.

2. The tree structure extraction apparatus, as defined in claim 1, wherein the cost of a root-node-side edge of a plurality of edges connectable to one of the undetermined nodes in the candidate of the tree structure, and which is connected in a direction closer to the first root node, is weighted in such a manner that a probability of connection of the root-node-side edge is higher as an angle formed by all of the plurality of edges connectable to the one of the undetermined nodes excluding the root-node-side edge is smaller.

3. The tree structure extraction apparatus, as defined in claim 1, the apparatus further comprising:

a second tree structure node candidate detection means that extracts, from the medical image data, a provisional tree structure defined by a plurality of nodes representing the first linear structure and the second linear structure and a plurality of edges connected to the plurality of nodes, and obtains, as a candidate of the first root node, a root node of the extracted provisional tree structure in the provisional tree structure, and identifies an edge of the plurality of edges defining the provisional tree structure that satisfies a condition that an angle between a direction from the candidate of the first root node toward a node in the provisional tree structure and a direction in which an edge connected to the node in such a manner to be away from the candidate of the first root node extends in the direction away from the candidate of the first root node is larger than a predetermined value, and detects, as a candidate of a node constituting the second tree structure, the node connected to the identified edge in such a manner to be away from the candidate of the first root node; and a root node detection means that obtains, from the medical image data, a candidate of another tree structure defined by a plurality of nodes representing the second linear structure and a plurality of edges connected to the plurality of nodes, and obtains a provisional position of the second root node in the medical image data, and detects an edge in the candidate of the other tree structure, and the edge being connected in a direction closer to the provisional position from a node corresponding to the detected candidate of the node constituting the second tree structure by selecting, as an origin, the node corresponding to the detected candidate of the node constituting the second tree structure from the nodes constituting the other tree structure, and detects an opposite-end node connected to the detected edge, and repeats detecting an edge of the edges in the candidate of the other tree structure connected to the detected node in such a manner to be closer to the provisional position, and detecting an opposite-end node connected to the detected edge, and that detects, as a candidate of the second root node, the detected node when no edge connected to the detected node in such a manner to be closer to the provisional position is present in the candidate of the other tree structure, wherein the tree structure creation means obtains, as the second root node, a node in the candidate of the tree structure, the node being located at a position corresponding to the candidate of the second root node detected by the root node detection means, and obtains, as the first root node, a node in the candidate of the tree structure, the node being located at a position corresponding to the candidate of the first root node.

4. The tree structure extraction apparatus, as defined in claim 2, the apparatus further comprising:

a second tree structure node candidate detection means that extracts, from the medical image data, a provisional tree structure defined by a plurality of nodes representing the first linear structure and the second linear structure and a plurality of edges connected to the plurality of nodes, and obtains, as a candidate of the first root node, a root node of the extracted provisional tree structure in the provisional tree structure, and identifies an edge of the plurality of edges defining the provisional tree structure that satisfies a condition that an angle between a direction from the candidate of the first root node toward a node in the provisional tree structure and a direction in which an edge connected to the node in such a manner to be away from the candidate of the first root node extends in the direction away from the candidate of the first root node is larger than a predetermined value, and detects, as a candidate of a node constituting the second tree structure, the node connected to the identified edge in such a manner to be away from the candidate of the first root node; and a root node detection means that obtains, from the medical image data, a candidate of another tree structure defined by a plurality of nodes representing the second linear structure and a plurality of edges connected to the plurality of nodes, and obtains a provisional position of the second root node in the medical image data, and detects an edge in the candidate of the other tree structure, and the edge being connected in a direction closer to the provisional position from a node corresponding to the detected candidate of the node constituting the second tree structure by selecting, as an origin, the node corresponding to the detected candidate of the node constituting the second tree structure from the nodes constituting the other tree structure, and detects an opposite-end node connected to the detected edge, and repeats detecting an edge of the edges in the candidate of the other tree structure connected to the detected node in such a manner to be closer to the provisional position, and detecting an opposite-end node connected to the detected edge, and that detects, as a candidate of the second root node, the detected node when no edge connected to the detected node in such a manner to be closer to the provisional position is present in the candidate of the other tree structure, wherein the tree structure creation means obtains, as the second root node, a node in the candidate of the tree structure, the node being located at a position corresponding to the candidate of the second root node detected by the root node detection means, and obtains, as the first root node, a node in the candidate of the tree structure, the node being located at a position corresponding to the candidate of the first root node.

5. The tree structure extraction apparatus, as defined in claim 3, wherein the second tree structure node candidate detection means defines the angle between the direction from the candidate of the first root node toward the node in the provisional tree structure and the direction in which the edge connected to the node extends in the direction away from the candidate of the first root node by an inner product of a vector from the candidate of the first root node toward the node in the provisional tree structure and a vector extending in a direction away from the candidate of the first root node in such a manner to be parallel to the edge connected to the node.

6. The tree structure extraction apparatus, as defined in claim 3, wherein the origin of the first linear structure and the origin of the second linear structure are located close to each other in the medical image data, and wherein the root node detection means obtains the position of the candidate of the first root node, as a provisional position of the second root node.

7. The tree structure extraction apparatus, as defined in claim 5, wherein the origin of the first linear structure and the origin of the second linear structure are located close to each other in the medical image data, and wherein the root node detection means obtains the position of the candidate of the first root node, as a provisional position of the second root node.

8. The tree structure extraction apparatus, as defined in claim 3, wherein the root node detection means identifies, as an edge connected to the detected node in such a manner to be closer to the provisional position, an edge having the largest angle between a direction from the provisional position of the second root node toward the node in the candidate of the other tree structure and a direction in which the edge connected to the node extends in a direction away from the candidate of the node constituting the second tree structure.

9. The tree structure extraction apparatus, as defined in claim 5, wherein the root node detection means identifies, as an edge connected to the detected node in such a manner to be closer to the provisional position, an edge having the largest angle between a direction from the provisional position of the second root node toward the node in the candidate of the other tree structure and a direction in which the edge connected to the node extends in a direction away from the candidate of the node constituting the second tree structure.

10. The tree structure extraction apparatus, as defined in claim 6, wherein the root node detection means identifies, as an edge connected to the detected node in such a manner to be closer to the provisional position, an edge having the largest angle between a direction from the provisional position of the second root node toward the node in the candidate of the other tree structure and a direction in which the edge connected to the node extends in a direction away from the candidate of the node constituting the second tree structure.

11. The tree structure extraction apparatus, as defined in claim 8, wherein the root node detection means defines the angle between the direction from the provisional position of the second root node toward the node in the candidate of the other tree structure and the direction in which the edge connected to the node extends in the direction away from the candidate of the node constituting the second tree structure by an inner product of a vector from the provisional position of the second root node toward a node in the candidate of the other tree structure and a vector extending in a direction away from the candidate of the node constituting the second tree structure in such a manner to be parallel to the edge connected to the node.

12. The tree structure extraction apparatus, as defined in claim 1, the apparatus further comprising:

an origin detection means that detects the origin of at least one of the first linear structure and the second linear structure by performing machine learning on a plurality of sets of training data representing the at least one of the linear structures, and in each of which an origin is known.

13. The tree structure extraction apparatus, as defined in claim 2, the apparatus further comprising:
an origin detection means that detects the origin of at least one of the first linear structure and the second linear structure by performing machine learning on a plurality of sets of training data representing the at least one of the linear structures, and in each of which an origin is known.

14. The tree structure extraction apparatus, as defined in claim 3, the apparatus further comprising:
an origin detection means that detects the origin of at least one of the first linear structure and the second linear structure by performing machine learning on a plurality of sets of training data representing the at least one of the linear structures, and in each of which an origin is known.

15. The tree structure extraction apparatus, as defined in claim 5, the apparatus further comprising:
an origin detection means that detects the origin of at least one of the first linear structure and the second linear structure by performing machine learning on a plurality of sets of training data representing the at least one of the linear structures, and in each of which an origin is known.

16. The tree structure extraction apparatus, as defined in claim 1, wherein the first linear structure and the second linear structure comprise blood vessels in a lung.

17. The tree structure extraction apparatus, as defined in claim 2, wherein the first linear structure and the second linear structure comprise blood vessels in a lung.

18. The tree structure extraction apparatus, as defined in claim 1, wherein the first linear structure and the second linear structure comprise blood vessels in a liver.

19. A tree structure extraction method that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the method comprising:
a tree structure creation step that creates, based on the medical image data, a candidate of a tree structure defined by a plurality of undetermined nodes representing the first linear structure and the second linear structure and a plurality of undetermined edges connecting the plurality of undetermined nodes, and determines a first root node corresponding to the origin of the first linear structure, as a node constituting the first tree structure, and also a second root node corresponding to the origin of the second linear structure, as a node constituting the second tree structure, in the created tree structure, and that compares each of costs representing probabilities of connection of the undetermined edges connected to the first root node and costs representing probabilities of connection of the undetermined edges connected to the second root node with each other, and selects, as a determined edge, the undetermined edge having the cost representing the highest probability of connection from the edges the costs of which have been compared, and selects, as a determined node, the undetermined node connected to the determined edge, and that repeats processing of comparing costs representing probabilities of connection of all of the undetermined edges connected to the determined nodes, and selects, as a determined edge, the undetermined edge that has a cost having the highest probability of connection from the undetermined edges the costs of which have been compared, and selects, as a determined node, the undetermined node connected to the determined edge, thereby making all of the undetermined nodes in the candidate of the tree structure determined, and creates the first tree structure defined by the determined edges and the determined nodes, and the origin of which is the first root node, and the second tree structure defined by the determined edges and the determined nodes, and the origin of which is the second root node,
wherein the costs are weighted in such a manner that a probability of connection of an edge satisfying the characteristic that each of the first linear structure and the second linear structure repeatedly branches from its origin and extends in directions away from the origin in such a manner to become wider is higher.

20. A tree structure extraction program stored on a non-transitory computer readable medium that extracts, from medical image data including a first linear structure and a second linear structure, each repeatedly branching from an origin and extending in directions away from the origin in such a manner to become wider, the first linear structure and the second linear structure as a first tree structure and a second tree structure respectively, each being defined by a plurality of nodes including a root node corresponding to the origin and a plurality of edges connecting the plurality of nodes, the program causing a computer to function as:
a tree structure creation instruction that creates, based on the medical image data, a candidate of a tree structure defined by a plurality of undetermined nodes representing the first linear structure and the second linear structure and a plurality of undetermined edges connecting the plurality of undetermined nodes, and determines a first root node corresponding to the origin of the first linear structure, as a node constituting the first tree structure, and also a second root node corresponding to the origin of the second linear structure, as a node constituting the second tree structure, in the created tree structure, and that compares each of costs representing probabilities of connection of the undetermined edges connected to the first root node and costs representing probabilities of connection of the undetermined edges connected to the second root node with each other, and selects, as a determined edge, the undetermined edge having the cost representing the highest probability of connection from the edges the costs of which have been compared, and selects, as a determined node, the undetermined node connected to the determined edge, and that repeats processing of comparing costs representing probabilities of connection of all of the undetermined edges connected to the determined nodes, and selects, as a determined edge, the undetermined edge that has a cost having the highest probability of connection from the undetermined edges the costs of which have been compared, and selects, as a determined node, the undetermined node connected to the determined edge, thereby making all of the undetermined nodes in the candidate of the tree structure determined, and creates the first tree structure defined by the determined edges and the determined nodes, and the origin of which is the first root node, and the second tree structure defined by the determined edges and the determined nodes, and the origin of which is the second root node, wherein the costs are weighted in such a manner that a probability of connection of an edge satisfying the characteristic that each of the first linear structure and the second linear structure repeatedly branches from its origin and extends in directions away from the origin in such a manner to become wider is higher.

\* \* \* \* \*